W. A. SPEAKMAN.
FAUCET ATTACHMENT.
APPLICATION FILED JULY 15, 1908.
918,788.
Patented Apr. 20, 1909.
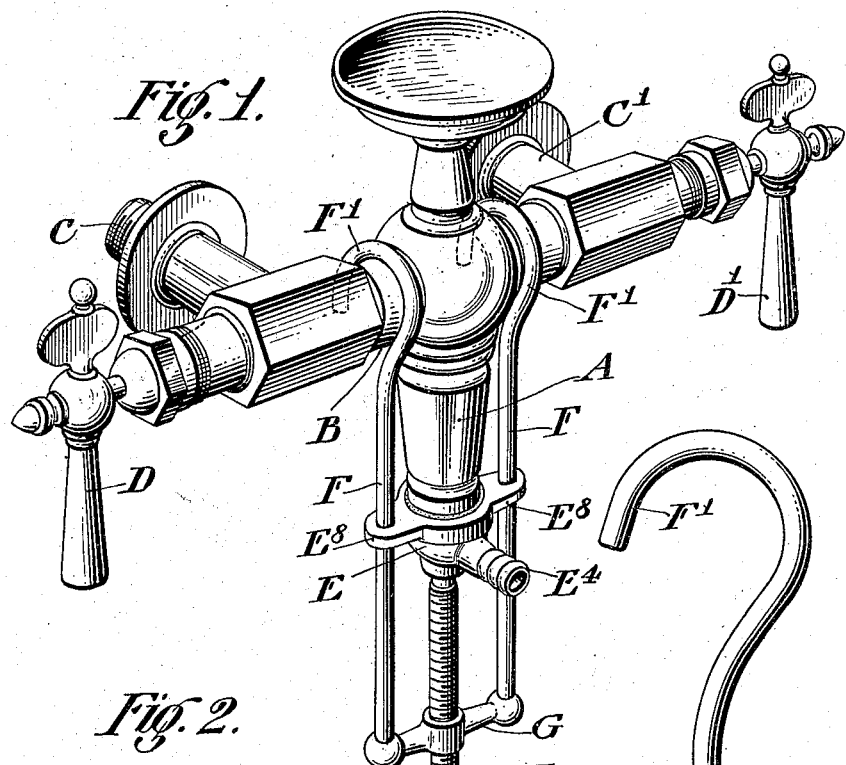
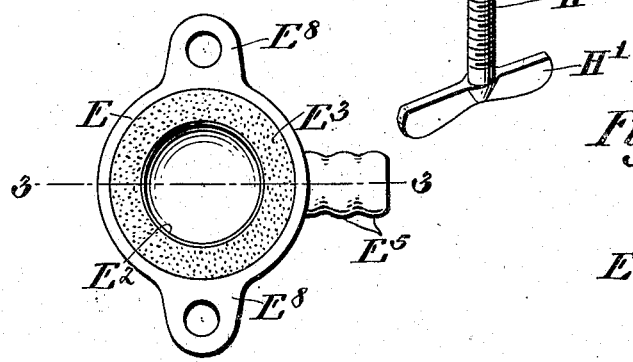
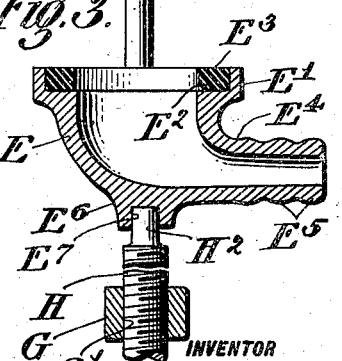
WITNESSES:
INVENTOR
Willard A. Speakman
BY
ATTORNEY.

UNITED STATES PATENT OFFICE.

WILLARD A. SPEAKMAN, OF WILMINGTON, DELAWARE.

FAUCET ATTACHMENT.

No. 918,788.  Specification of Letters Patent.  Patented April 20, 1909.

Application filed July 15, 1908. Serial No. 443,626.

*To all whom it may concern:*

Be it known that I, WILLARD A. SPEAKMAN, a citizen of the United States of America, residing in Wilmington, in the county of Newcastle and State of Delaware, have invented a certain new and useful Improvement in Faucet Attachments, of which the following is a true and exact description, reference being had to the accompanying drawings, which form a part thereof.

The present invention relates to hose connecting attachments for faucets and is primarily designed for attaching a hose such as is used for shower bath purposes to a hot and cold water mixing faucet of the kind commonly used with bath tubs.

The object of the invention is the provision of an attachment coupling which can be easily, quickly and positively secured in place and easily and quickly removed and which will be conveniently located, durable in construction and comparatively inexpensive to manufacture.

The various features of novelty which characterize the invention are pointed out with particularity in the claims annexed to and forming a part of this specification. For a better understanding of the invention, however, and the advantages possessed by it, reference may be had to the accompanying drawings and descriptive matter in which I have illustrated and described one form in which my invention may be modified.

Of the drawings, Figure 1 is a perspective view illustrating the attachment in place on an ordinary mixing faucet. Fig. 2 is a plan of the attachment body. Fig. 3 is a sectional elevation of the attachment body and fastening means, the section being taken on the line 3—3 of Fig. 2.

In the drawings B represents the body or mixing barrel of a hot and cold water mixing faucet of the type in common use in connection with bath tubs.

C and $C^1$ represent one of the cold water and the other the hot water supply pipes; communication between the barrel B and the pipe C and $C^1$ being controlled by the usual hand valves D and $D^1$, respectively.

From the under side of the barrel B and usually midway between its ends the spout A of the faucet projects.

E represents the body member of the attachment and is provided at one side with a seat for the end of the faucet spout A. In the form shown, the seat is provided with a packing washer $E^3$ of rubber or like material, which rests on the annular shoulder $E^2$ surrounding the passage through the body E, and is surrounded by the cylindrical shell portion $E^1$ of the body. At the opposite side of the body E from the spout end seat is provided a clamping screw seat which, as shown, is formed by providing a recess $E^7$ in a lug $E^6$ projecting from the under side of the body E. Perforated ears $E^8$ project from the body E at opposite sides of the axis of the faucet spout seat. The body E is also provided with a hose engaging nipple $E^4$ extending at one side of the spout engaging and clamping screw engaging seats. The nipple $E^4$ may be provided with the usual threads or corrugations $E^5$.

The means for securing the body E in place includes a yoke having a body portion G, located below the attachment body E and legs F secured at their lower ends to the body G and passing through the apertured ears $E^8$. The legs F, which may well be made of rods threaded at their lower ends into the body G, are provided at their upper ends with devices for engaging the barrel B, which may well consist of hooks $F^1$ formed integrally with the legs F and adapted to fit over the faucet barrel B at the sides of the spout A. The body G is provided with a threaded aperture $G^1$ in line with the clamping screw seat $E^7$. A clamping screw H threaded through the aperture $G^1$ and having a reducing end $H^2$ adapted to enter the recess $E^7$ in the lug $E^6$, and provided at its lower end with a handle $H^1$ forming a means for clamping the parts together, as shown in Fig. 1.

It will be observed that the construction disclosed is exceedingly simple and effective for the purposes for which it is designed.

The rods F are so located that the clamping pull is in line with the axis of the spout A and the corresponding seat on the body E. The location of the nipple $E^4$ at the side of the spout simplifies the construction and is advantageous in that it greatly reduces the tendency of the hose connected to the nipple to kink, which has heretofore been experienced with the arrangement used in which the hose has been connected in line with the spout A.

Having now described my invention, what I claim as new and desire to secure by Letters Patent is:

1. A hose connecting attachment for a mixing faucet, comprising a body E having a seat for a faucet spout end, a pair of perforated ears located at opposite sides of said seat, and a hose engaging nipple at one side of the axis of said seat, a yoke having its legs passing through said perforated ears and provided each with a faucet engaging hook, and having its body portion located at the other side of said body E from said seat and provided with a threaded aperture and a clamping screw threaded through said aperture and engaging said body E.

2. A hose connecting attachment for a mixing faucet comprising a body E having at one side a seat for a faucet spout end and at the other side a recessed seat for the end of a clamping screw and having a pair of perforated ears located at opposite sides of said seats, and a hose engaging nipple at one side of said seats, a yoke having its legs passing through said perforated ears and provided each with a faucet engaging hook and having its body portion located at the same side of said body E as said recessed seat, and provided with a threaded aperture in line with the said recessed seat and a clamping screw threaded through said aperture and having its end adapted to enter said recessed seat.

3. In combination a mixing faucet comprising a barrel and a spout extending laterally from the barrel between the ends of the latter, and a hose connecting attachment comprising a body E having at one side a seat for the end of said spout and at the other end a seat for the end of a clamping screw and having a hose engaging nipple extending to one side of said seat and having a pair of perforated ears located at opposite sides of said seats, a yoke having its legs passing through said perforated ears and provided each with a faucet engaging hook and having its body portion located at the same side of said body E as the clamping screw seat and provided with a threaded aperture in line with the last mentioned seat, and a clamping screw threaded through said aperture and having one end bearing against said clamping screw seat.

WILLARD A. SPEAKMAN.

Witnesses:
WM. H. GIBBONS,
ALFRED B. MOORE.